No. 882,409.
PATENTED MAR. 17, 1908.
W. McCALEB.
COTTON CHOPPER.
APPLICATION FILED DEC. 4, 1907.
2 SHEETS—SHEET 1.
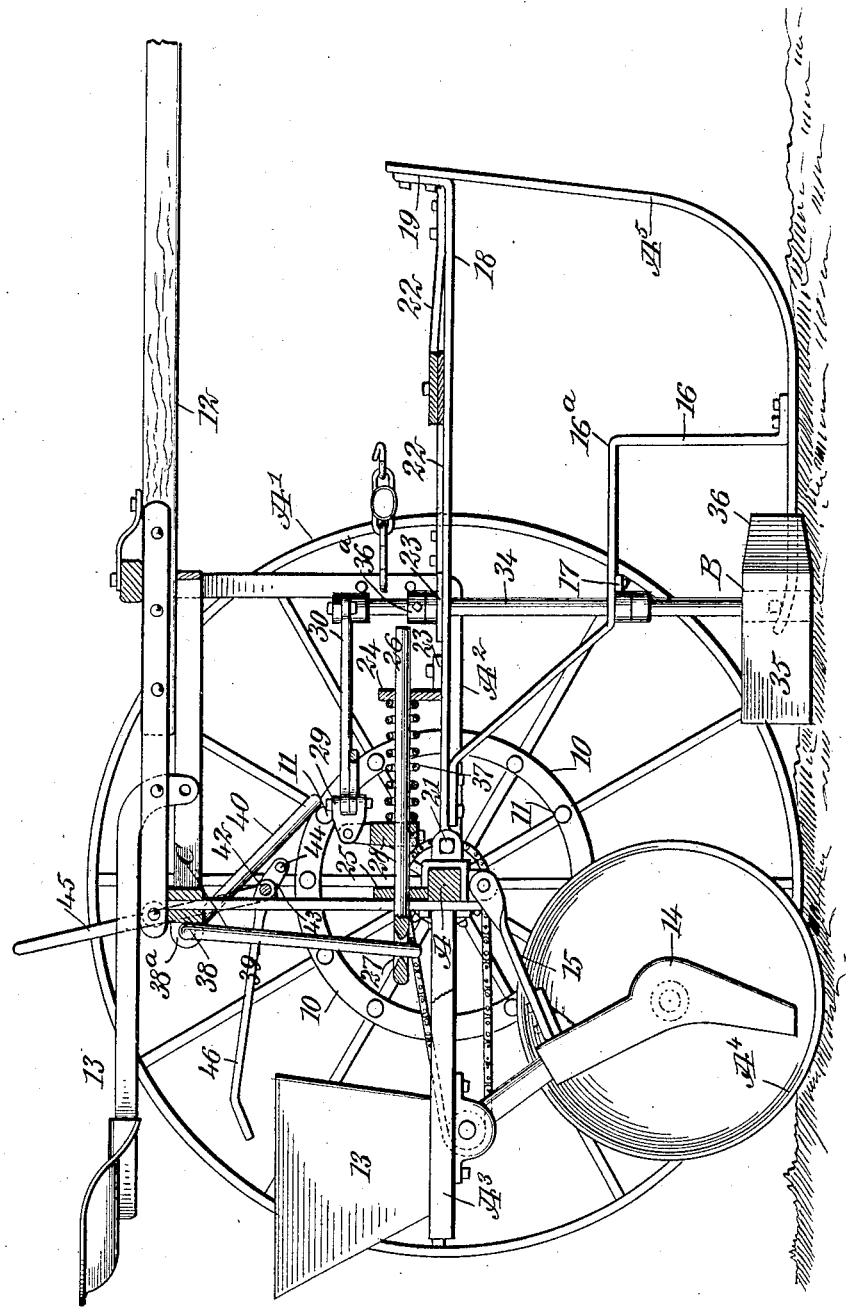
WITNESSES
INVENTOR
William McCaleb
BY
ATTORNEYS No. 882,409. PATENTED MAR. 17, 1908.
W. McCALEB.
COTTON CHOPPER.
APPLICATION FILED DEC. 4, 1907.
2 SHEETS—SHEET 2.
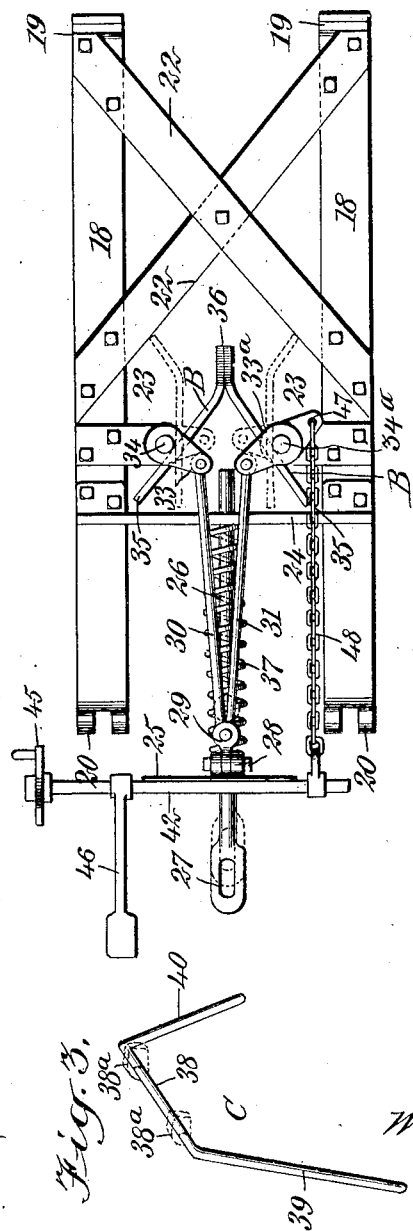
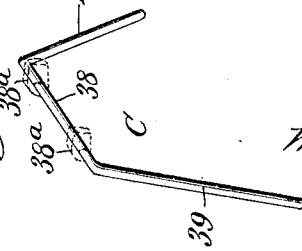
WITNESSES
Geo. W. Naylor
[signature]
INVENTOR
William McCaleb
BY Munn & Co
ATTORNEYS

UNITED STATES PATENT OFFICE.

WILLIAM McCALEB, OF BLUFFS, ILLINOIS.

COTTON-CHOPPER.

No. 882,409.     Specification of Letters Patent.     Patented March 17, 1908.

Application filed December 4, 1907. Serial No. 404,984.

*To all whom it may concern:*

Be it known that I, WILLIAM MCCALEB, a citizen of the United States, and a resident of Bluffs, in the county of Scott and State of Illinois, have invented a new and useful Improvement in Cotton-Choppers, of which the following is a full, clear, and exact description.

The purpose of the invention is to provide a cotton chopper attachment to cultivators and planters, or machines in which the cultivator is combined with the planter, and to so construct the attachment that it will be simple, durable, and economic, and so that it will be automatically operated by the movement of the machine to which it is applied.

Another purpose of the invention is to so construct the hoes that they will operate laterally at the surface of the ground, and to provide mechanism whereby the hoes will be automatically separated, leaving a hill in their path standing, wherein as soon as the hill is passed the hoes will be automatically drawn together and will at such time cleanly remove the cotton plants and weeds adjacent to the standing hill.

It is also a purpose of the invention to so construct the machine that it may be operated by means of a foot lever, opening and closing at the will of the operator, so that any particular plant or plants may be removed from a row at any point in the length thereof.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a vertical section through a combined planter and cultivator, and a longitudinal section through the improved attachment; Fig. 2 is a detail plan view of the attachment, and a section through a guide plate adapted to be secured to the implement; and Fig. 3 is a detail perspective view of the actuating shaft for the attachment.

I desire it to be understood that although I have illustrated the attachment applied to a combined planter and cultivator, it may be applied with equally good results to a cultivator or to a harrow.

In the combined cultivator and planter shown in the drawings, A represents the axle of the machine, A' one of the supporting wheels, and one of the said supporting wheels is provided with a ring 10 upon its inner face, attached to its spokes or applied thereto in any other approved manner, and pins or projections 11 are made to extend inward from the said ring 10, one of the said pins or projections being located opposite each spoke in the wheel, but the position of said projection may be changed as the character of the work may demand.

$A^2$ represents the forward frame of the machine and $A^3$ the rear portion of the frame. This rear portion $A^3$ of the frame is shown as supporting a seed hopper 13 and a seed drop chute 14. The forward frame $A^2$ is shown as provided with a tongue 12 at its upper portion, and a disk cultivator $A^4$ is shown supported from the axle A by means of a suitable link 15 or equivalent support. $A^5$ represents one of the forward shoes which may be of any approved type, and the said shoes $A^5$ are shown as connected with the frame $A^2$ by means of braces 16, and said braces are of the stepped type, and their horizontal central portions $16^a$ are provided with inwardly extending lugs 17.

The attachment proper is best shown in Fig. 2. It consists of a frame composed of parallel bars 18 of any desired length, and ordinarily these bars 18 are up-turned at their forward ends, as is illustrated at 19 in the drawings, and the said up-turned end of the bars 18 are secured to the forward portions of the shoes $A^5$. Knuckles 20 are produced at the rear ends of the said bars 18 and these knuckles are hinged to the axle A in any suitable manner, as is shown at 21 in Fig. 1.

The forward portion of the frame of the attachment is strengthened by means of crossed braces 22 that extend usually from their forward ends to a point near their centers, as is particularly shown in Fig. 2, and at the rear of the crossed braces 22 inwardly extending plates or lugs 23 are formed, and at the rear of the said lugs or plates 23, a transverse upwardly extending guide bar 24 is carried from one frame member 18 to the other, and opposite the rear portion of the transverse guide bar 24 a second guide bar 25 extends upward from the axle A of the machine, as is illustrated in Fig. 1. A plunger 26 is located above the frame and has guided movement in the guide bars 27 and 25, as is best shown in Fig. 1, and at the rear end of the plunger 26 a slot or an eye 27 is formed. A collar 28 is secured to the plunger 26 between the guide bars 24 and 25, and a cap piece 29 is pivoted to the upper portion of the said collar 28, the said cap being made to extend in a forward direction.

The rear ends of links 30 and 31 are pivoted in the said cap piece 29, and the forward ends of the said links 30 and 31 are made to diverge, as is best shown in Fig. 2. The link 30 is pivotally connected with a crank arm 33, and the link 31 is pivotally connected with a corresponding crank arm 33$^a$. The crank arm 33 is secured upon the upper end of a shaft 34, that extends downward to a point near the ground, at the lower end of the said shaft 34 a hoe B is attached, the said hoe occupying a horizontal position, and the hoe B is of angular construction, being provided with a rearwardly extending member 35 that is attached to the shaft 34, and a forwardly extending member 36 that is shorter than the member 35. The crank arm 33 is attached to a shaft 34$^a$ that is parallel with the shaft 34, and extends likewise downward to a point near the ground, and at the lower end of the shaft 34$^a$, a hoe B is also secured, corresponding in formation to the hoe attached to the shaft 34. These shafts are held to turn in the lower guide plates 17 attached to the braces 16, and likewise turn in the guide plates 23 of the frame of the attachment, the said guide plates 23 being immediately above the guide plates 17, as is illustrated in Fig. 1, and the shafts 34, 34$^a$ are prevented from having vertical movement, by placing collars 36$^a$ thereon below the lower guide plates 17 and above the upper guide plates 23, as is shown in Fig. 1. A spring 37 is coiled around the plunger 26, and this spring has bearing against the forward guide plate 24 of the attachment and the collar 28, as is best shown in Fig. 1.

In connection with the plunger 26, I employ an actuating arm C, which actuating arm is of substantially U-shape, consisting of an upper member 38, that is pivoted in suitable bearings 38$^a$, located at the upper rear portion of the forward frame section A$^2$ of the machine, a downwardly extending member 39, that is passed through the eye 27 in the plunger 26, and an opposing downwardly and forwardly extending member 40, that is adapted for engagement with the pins or projections 11 from the spokes of the said supporting wheel A.

Normally the shorter or forward members 36 of the hoes B are in engagement, as is illustrated in full lines in Fig. 2, and in operation as the machine advances and the member 40 of the actuating shaft C is engaged by the pin 11, the plunger 26 will be moved in a rearward direction, thus causing the hoes B to separate, as is shown in dotted lines in Fig. 2, permitting the hoes to pass at each side of a hill and not disturb it, but as soon as a hill is passed the member 40 of the actuating shaft C will be disengaged from the pin 11 with which it was in engagement, and the spring 37 which was placed under tension will then act to force the hoes together at their forward ends, as is shown in Fig. 2, thus causing the lower edges of the hoes, which are sharp, to clean the ground from weeds and from the surplus plants.

One manner of throwing the actuating arm C out of engagement with the projections 11 on the ring 10, is by mounting a shaft 42 at the rear of the frame and the rear of the forwardly-extending member 40 of said arm, as is shown in Fig. 1 and providing said shaft with a forwardly-extending crank-arm 43 having a pin 44 which, when the shaft is rocked in one direction through the medium of a hand-lever 45, engages the member 40 of the actuating arm C, in a manner to lift said member 40 from the path of the pins 11. When the actuating arm is thus rendered inoperative, the hoes B can be manually operated at pleasure through the medium of a foot-lever 46, that extends rearward from the said shaft 42; and upon one of the upright shafts for a hoe B, the right-hand shaft 34$^a$, for example, an outwardly-extending auxiliary crank-arm 47 is screwed and is attached by a chain 48 or its equivalent with the said shaft 42. Thus, by rocking the shaft 42 at any required time the hoes can be simultaneously operated in like manner as when automatically controlled.

It will be understood that the cotton-chopping mechanism described, may be attached to a cultivator or similar agricultural implement of any description, or that the said cotton-chopping mechanism may be individually employed, in which event it is carried by a suitable frame supported by wheels or runners, so that the device may be pushed or pulled.

This attachment is exceedingly simple in its construction, is positive in its action and is durable, and is applicable to any type of cultivator or planter.

Having thus described my invention, I claim as new and desire to secure by Letters Patent,—

1. The combination with a cultivator or like machine, of a cotton chopping attachment consisting of a frame, shafts mounted to revolve in the frame, opposing hoes carried by the shafts, a plunger, connections between the plunger and said shafts whereby through the movement of the plunger the shafts are rocked to carry the hoes to and from each other, means for operating the plunger in one direction by the movement of the machine, and means independent of the machine for operating the plunger in an opposite direction.

2. The combination with wheel-supported cultivator or like machine, and circularly arranged projections extending from one of the supporting wheels, of a cotton chopping attachment consisting of a frame secured to the said machine, vertical opposing shafts mounted to revolve in said frame, opposing angular hoes secured at the lower ends of the shafts, a spring-controlled plunger having sliding movement relatively to the frame, crank and link connections between the plunger and the shafts, and an actuating shaft engaging with the plunger and also with the projections from the said supporting wheel of the machine.

3. The combination with a cultivator or like machine, and circularly arranged projections from one of its supporting wheels, of a frame carried by the said machine, vertical shafts carried by the frame, crank arms at the upper ends of the shafts, angular horizontally located hoes carried at the lower ends of the shafts, a spring-controlled plunger mounted to slide in the frame, diverging links pivotally connected with the plunger and one with a crank arm of each of said shafts, and an actuating shaft having a member that engages with the plunger, and a member that engages with the projections from the said supporting wheel.

4. A cotton chopping attachment for cultivators and like machines, consisting of a frame, vertical shafts mounted to turn in the frame, angular hoes horizontally located at the lower ends of the shafts, a spring-controlled plunger, guides therefor, links pivotally attached at their rear ends to said plunger and at their forward ends to said shafts, and an actuating shaft comprising a horizontal member and downwardly extending members, the downwardly extending members being at angles to each other, one of said members being adapted for engagement with the said plunger.

5. In a cotton chopping attachment for cultivators and like machines, a frame fitted at one end for attachment to the forward portion of the machine and fitted at its opposite end for hinged connection with the machine, parallel vertical shafts mounted to revolve in the frame and extending downwardly therefrom, a crank arm at the upper end of each of said shafts, a hoe secured to the lower end of each of said shafts, said hoes being of angular formation and comprising a long rearwardly and outwardly extending member attached to the shaft and a shorter and forwardly extending member free from the shaft, the forwardly extending members in one position of the hoes being adapted for engagement, a spring-controlled plunger, guides therefor, a horizontal cap piece pivotally connected with the said plunger, diverging arms pivoted to the said cap piece and one to each of the said crank arms of the said shafts, and an actuating shaft comprising a horizontal member and downwardly extending members, one of the downwardly extending members being adapted to enter an opening in the rear end of the said plunger.

In testimony whereof I have signed my name to this specification in the presence of two subscribing witnesses.

WILLIAM McCALEB.

Witnesses:
E. D. BEIRD,
A. P. PROUDFIT.